(12) United States Patent
Silverman

(10) Patent No.: US 8,638,366 B2
(45) Date of Patent: Jan. 28, 2014

(54) IN-GROUND CAMERA

(75) Inventor: Jeff Silverman, Jacksonville, VT (US)

(73) Assignee: Fox Sports Productions, Los Angeles, CA (US)

( * ) Notice: Subject to any disclaimer, the term of this patent is extended or adjusted under 35 U.S.C. 154(b) by 1013 days.

(21) Appl. No.: 12/421,157

(22) Filed: Apr. 9, 2009

(65) Prior Publication Data

US 2009/0256913 A1 Oct. 15, 2009

Related U.S. Application Data

(60) Provisional application No. 61/044,222, filed on Apr. 11, 2008, provisional application No. 61/089,123, filed on Aug. 15, 2008.

(51) Int. Cl.
*H04N 7/18* (2006.01)

(52) U.S. Cl.
USPC .......................................................... 348/157

(58) Field of Classification Search
USPC ................. 348/157, 220.1, 373, 376; 422/58; 340/907, 905; 715/769; 705/13; 359/754; 701/28
See application file for complete search history.

(56) References Cited

U.S. PATENT DOCUMENTS

| | | | | |
|---|---|---|---|---|
| 5,894,369 A * | 4/1999 | Akiba et al. | ................. | 359/820 |
| 5,974,978 A * | 11/1999 | Brown et al. | ................. | 104/304 |
| 6,607,606 B2 * | 8/2003 | Bronson | ........................... | 134/6 |
| 6,718,130 B2 * | 4/2004 | Grober | ............................ | 396/55 |
| 7,522,834 B2 * | 4/2009 | Heaven et al. | ................ | 396/535 |
| 7,688,222 B2 * | 3/2010 | Peddie et al. | ................. | 340/905 |
| 2004/0001150 A1 * | 1/2004 | Schindler et al. | .......... | 348/220.1 |
| 2004/0119881 A1 * | 6/2004 | Matko et al. | .................. | 348/375 |
| 2005/0142033 A1 * | 6/2005 | Glezer et al. | .................... | 422/58 |
| 2005/0185061 A1 * | 8/2005 | Baker | ........................ | 348/211.4 |
| 2005/0200978 A1 * | 9/2005 | Tesar et al. | ..................... | 359/754 |
| 2005/0270175 A1 * | 12/2005 | Peddie et al. | ................. | 340/907 |
| 2005/0286972 A1 * | 12/2005 | Gongolas | .......................... | 404/9 |
| 2007/0033539 A1 * | 2/2007 | Thielman et al. | ............. | 715/769 |
| 2008/0013944 A1 * | 1/2008 | Yamane et al. | ............... | 396/427 |
| 2008/0252777 A1 * | 10/2008 | Haruyama | ..................... | 348/376 |
| 2008/0319837 A1 * | 12/2008 | Mitschele | ........................ | 705/13 |
| 2009/0201413 A1 * | 8/2009 | Fishman | ........................ | 348/373 |
| 2009/0256913 A1 * | 10/2009 | Silverman | ...................... | 348/157 |
| 2009/0256914 A1 * | 10/2009 | Silverman | ...................... | 348/157 |
| 2010/0117820 A1 * | 5/2010 | Mitschele | .................. | 340/539.1 |
| 2012/0143430 A1 * | 6/2012 | Broggi et al. | .................... | 701/28 |

FOREIGN PATENT DOCUMENTS

WO WO 9918554 A1 * 4/1999 ............ G08G 1/017

OTHER PUBLICATIONS

Myers, Jim, "Nights of 'Thunder'//Oval Track Comes Right into Living Room//Down-home Racing gets Big Exposure," USAToday.com, Jul. 18, 1991, printed Jun. 24, 2009, 2 pgs.*

Potts, John, "Settling The Gopher Cam Debate, and the NASCAR TV Weekend That Was the Race for Ratings Points: Critiquing NASCAR TV," www.frontstretch.com, Mar. 11, 2009, printed Jun. 24, 2009, 2 pgs.*

(Continued)

*Primary Examiner* — Imad Hussain
(74) *Attorney, Agent, or Firm* — Cantor Colburn LLP

(57) ABSTRACT

An apparatus and method is provided for a unique camera experience, wherein the camera is placed in an in-ground position permitting recording or broadcast of a camera perspective that is along the surface of or above the surface of the ground. In an exemplary embodiment, the in-ground camera is secured within the surface of a racetrack.

12 Claims, 10 Drawing Sheets

(56) References Cited

OTHER PUBLICATIONS

"Meet the Original 'Gopher Cam,'" dalyplanet.blogspot.com, Feb. 19, 2008, printed Jun. 24, 2009, 9 pgs.*

Written Opinion and International Search Report for PCT/US2009/040152 dated Nov. 5, 2009.
Written Opinion and International Search Report for PCT/US2009/040170 dated Jun. 29, 2009.

* cited by examiner

IN-GROUND CAMERA

CROSS REFERENCE TO RELATED APPLICATIONS

The present application claims priority to U.S. Provisional Patent Application Ser. No. 61/044,222 filed Apr. 11, 2008; and, to U.S. Provisional Patent Application Ser. No. 61/089,123 filed Aug. 15, 2008, the entire contents of which are specifically incorporated by reference herein.

BACKGROUND

Camera coverage is an essential part of every broadcast sporting event. For example, racing enthusiasts will easily recognize that a large number of cameras are routinely utilized to provide full coverage of a racing event, oftentimes with multiple cameras in each turn, multiple cameras at various elevations above the racing track, cameras within race cars, and multiple cameras in the pit. There are also other applications that would benefit from such an in-ground camera system, e.g. other types of roadways, etc.

What is needed in the art are other unique products and methods for enhancing the amount and quality of recorded or broadcast coverage from sporting event or other surfaces.

SUMMARY

The presently described apparatus and methods provide a unique camera experience, wherein the camera is placed in an in-ground position permitting recording or broadcast of a camera perspective that is along the surface of or above the surface of the ground.

In an exemplary embodiment, the in-ground camera is secured within the surface of a racetrack, and the upper surface portion of the camera housing provides only smooth or low-profile transition surfaces. This discrete footprint ensures that the camera does not endanger drivers and minimizes potential damage to the camera that might otherwise result from being run over thousands of times by more than 40 cars traveling at great speeds. To this end, the surface comprises an exemplary hardened material, such as stainless steel, that is resistant to the forces of high-speed vehicles passing thereover.

In exemplary embodiments, the upper surface portion of the camera housing comprises an at least partially dome like surface that is devoid of exposed pointed edges. In other exemplary embodiments, the camera rises a maximum distance of 0.25 inches above the surface of the track, although somewhat higher or lower distances are contemplated. Also, in exemplary embodiments, the at least partially dome-like surface has a diameter of about 4 inches to provide a gentle transition between the track surface and the top surface of the camera housing, although somewhat larger or smaller diameters are contemplated.

In other exemplary embodiments, the in-ground camera is secured to a base portion, which is in turn secured within a hole in the surface of the racetrack. Thus, at least the upper surface portion of the camera housing and primary elements of the camera itself may be removed from the fixed base portion and transferred to other base portion locations. In exemplary embodiments, a dummy plate is configured to secure over base portions not being used by a camera. In embodiments, the dummy plate is configured to be generally flat or flush with respect to the racetrack surface.

In other exemplary embodiments, the in-ground camera incorporates a microphone to provide audio with the camera video.

In other exemplary embodiments, the in-ground camera incorporates an air or fluid spray system for cleaning the lens of the camera during use. The shape of the camera surface, with its cutout camera view section, and/or the speed of the vehicles can also be used to quickly dry any water sprayed on the lens.

BRIEF DESCRIPTION OF THE DRAWINGS

Referring now to the drawings, wherein like elements are numbered alike in the following FIGURE.

DETAILED DESCRIPTION OF EXEMPLARY EMBODIMENTS

As is discussed above, the present invention relates to an in-ground camera apparatus and method for providing recorded or broadcast media from a ground surface. While the following exemplary application will describe, for convenience, the camera as being installed within the surface of a race-track, it should be understood that other surfaces and uses are contemplated herein.

Figure 1:
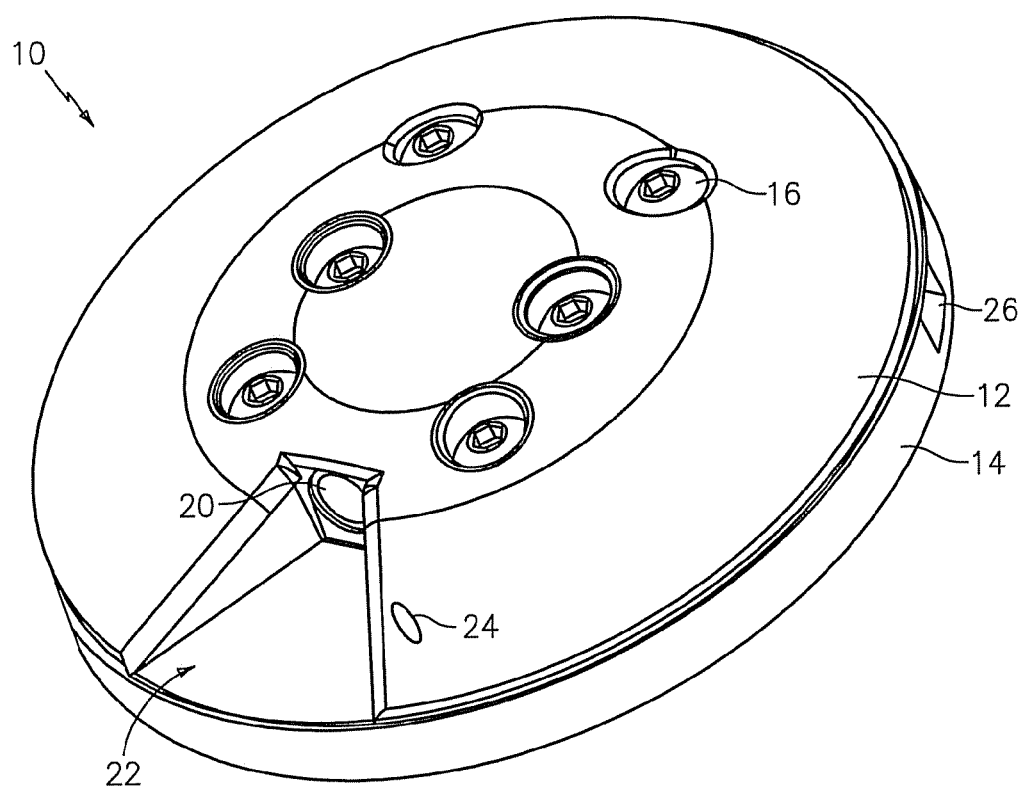
FIG. 1 is a perspective view of an exemplary in-ground camera.

Referring now to FIG. 1, an exemplary in-ground camera is illustrated generally at 10. The illustrated camera includes an upper surface portion 12 and a base portion 14. As is illustrated, the upper surface portion 12 of the camera provides only smooth or low-profile transition surfaces. In an exemplary racetrack application, this discrete footprint ensures that the camera does not endanger drivers and minimizes potential damage to the camera that might otherwise result from being run over thousands of times by more than 40 cars traveling at great speeds. To this end, the surface comprises an exemplary hardened material, such as stainless steel, that is resistant to the forces of high-speed vehicles passing thereover.

The illustrated exemplary upper surface portion 12 of the camera may be described as an at least partially dome like surface that is devoid of exposed pointed edges. In exemplary embodiments, the camera rises a maximum distance of 0.25 inches above the surface of the racetrack surface, although somewhat higher or lower distances are contemplated. Also, in exemplary embodiments, the at least partially dome-like surface has a diameter of about 4 inches to provide a gentle transition between the track surface and the top surface of the camera housing, although somewhat larger or smaller diameters are contemplated.

Figure 2:
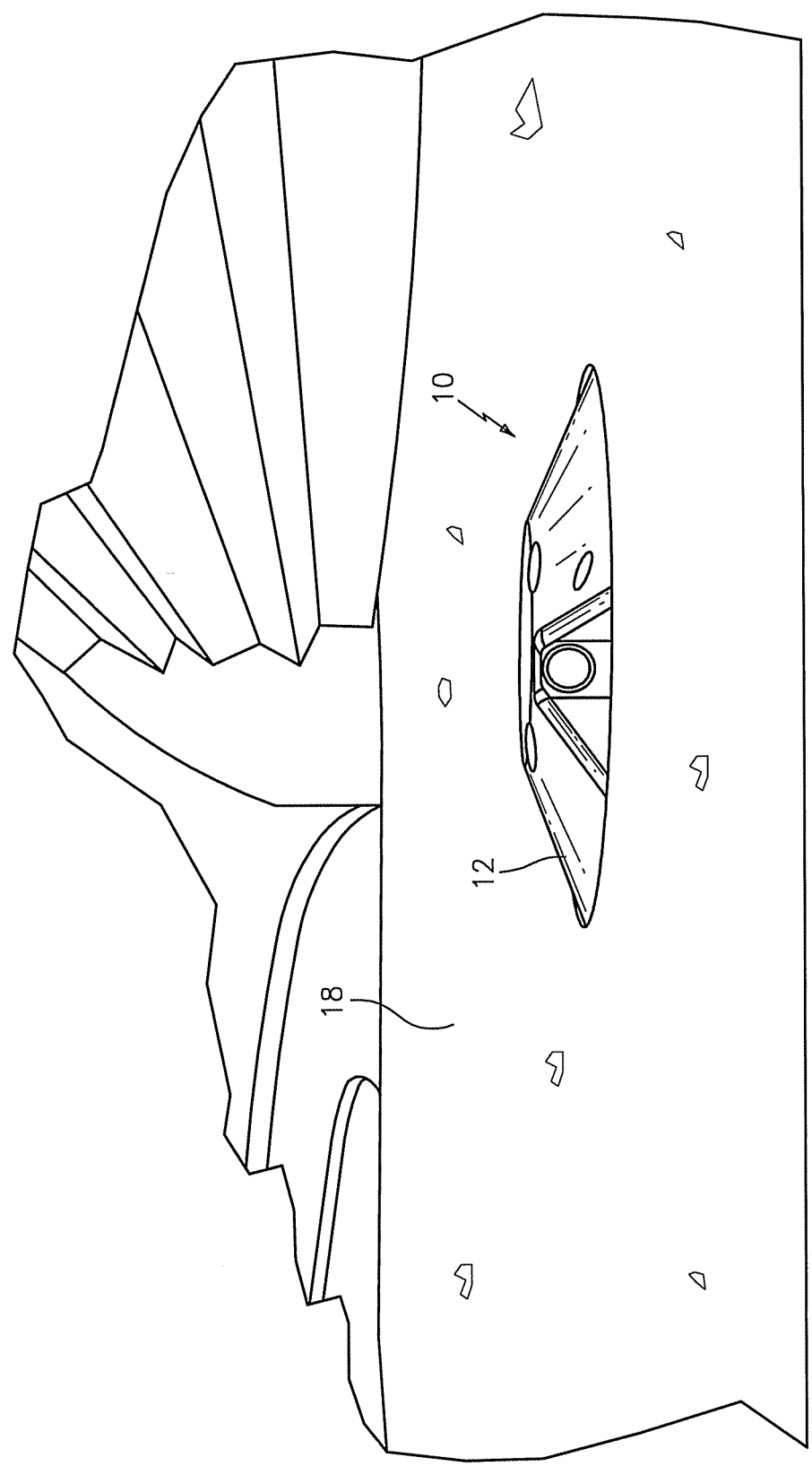
FIG. 2 is a front elevation view of an exemplary installed in-ground camera.

Referring again to FIG. 1, the in-track camera is secured to the base portion 14 (e.g., by the six illustrated screws 16), which base portion 14 is in turn secured within a hole in the surface of the racetrack. Reference is made to FIG. 2, which illustrates the exemplary camera 10 of FIG. 1 installed in the surface 18 of a racetrack.

As will be discussed in more detail below, at least the upper surface portion 12 of the camera housing and primary elements of the camera itself may be removed from the fixed base portion and transferred to other base portion locations. In exemplary embodiments, a dummy plate (not shown) is configured to secure over base portions not being used by a camera. In embodiments, the dummy plate is configured to be generally flat or flush with respect to the racetrack surface 18.

Referring again to FIG. 1, the upper surface portion also includes a camera lens 20 and a lens view cutout, shown generally at 22. The upper surface portion may also include an air or fluid spray system for cleaning the lens of the camera during use. This system utilizes air or fluid channel 24 to direct air or fluid at the lens 20. The shape of the camera surface, with its cutout camera view section, and/or the speed of the vehicles can also be used to quickly dry any water sprayed on the lens.

The illustrated exemplary embodiment of FIG. 1 also includes a conduit channel 26. During installation, a conduit would be drilled underneath the racetrack surface and aligned with the conduit channel 26 of the camera. Thus, media data may be passed from the camera through the conduit underneath the racetrack surface. Wireless transmission may also be used along with or in lieu of the conduit.

Figure 3:
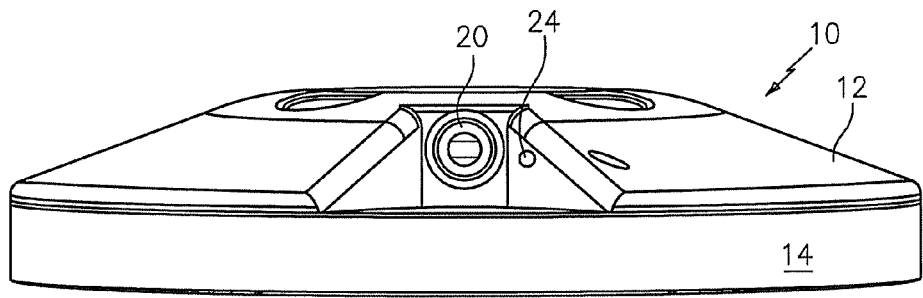
FIG. 3 is a front elevation view of the exemplary in-ground camera of FIG. 1.

FIG. 3 illustrates a front elevation view of the exemplary camera of FIG. 1. From this elevation, the rounded surfaces of the upper surface portion 12 may be seen as well as the portion of the air or fluid channel 24 that directs air or fluid towards the lens 20.

Figure 4:
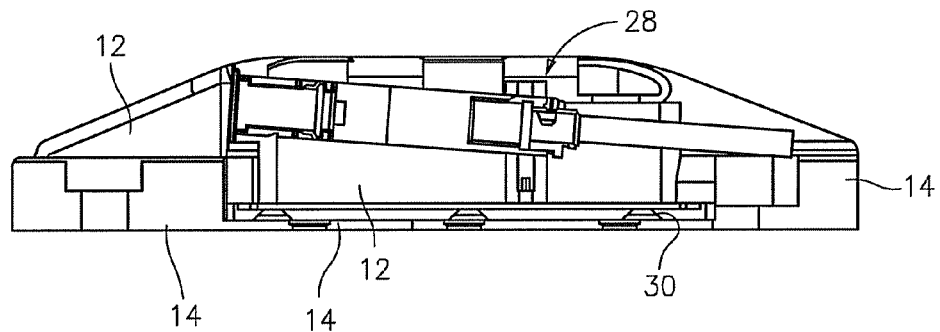
FIG. 4 is a side cross sectional view of the exemplary in-ground camera of FIG. 1.

FIG. 4 is an exemplary illustration of how the primary elements of the camera (shown generally at 28), which are housed within the upper surface portion 12, interface with the base portion 14. Vibration isolators 30 may also be provided in the interface between the upper surface portion 12 and the base portion 14.

Figure 5:
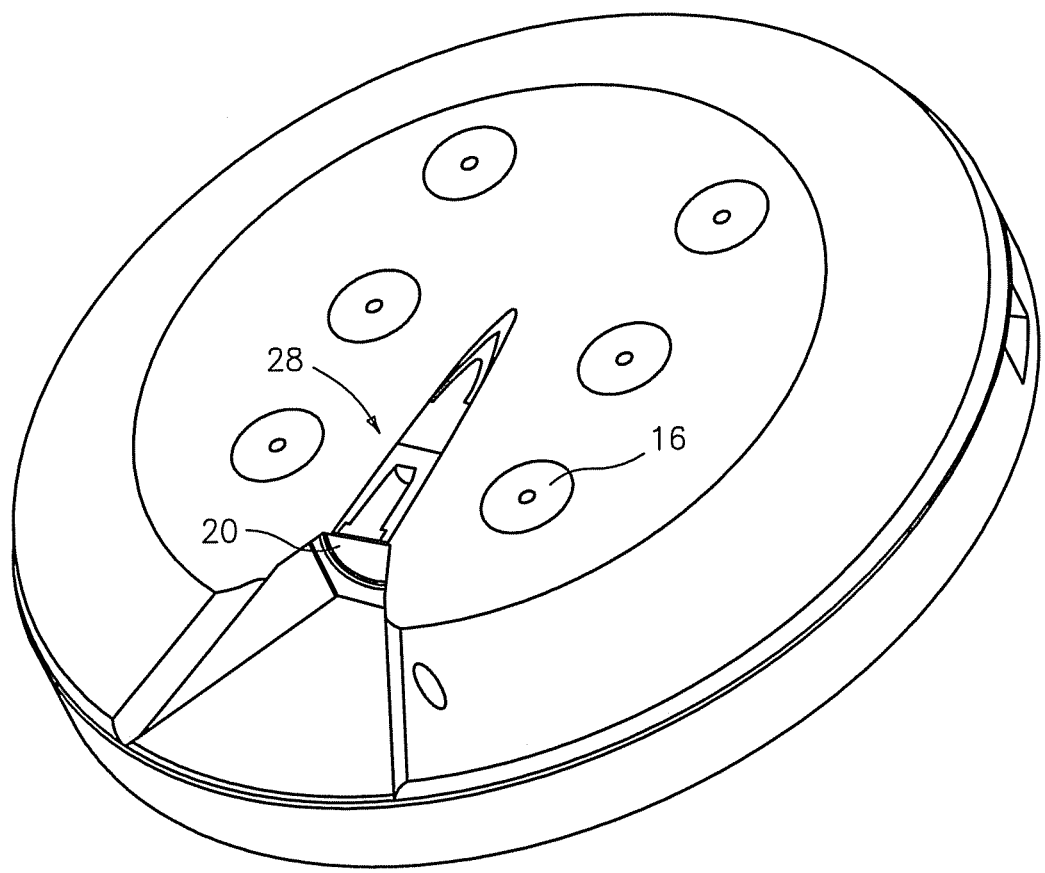
FIG. 5 is a perspective cross sectional view of the exemplary in-ground camera of FIG. 1.
Figure 6:
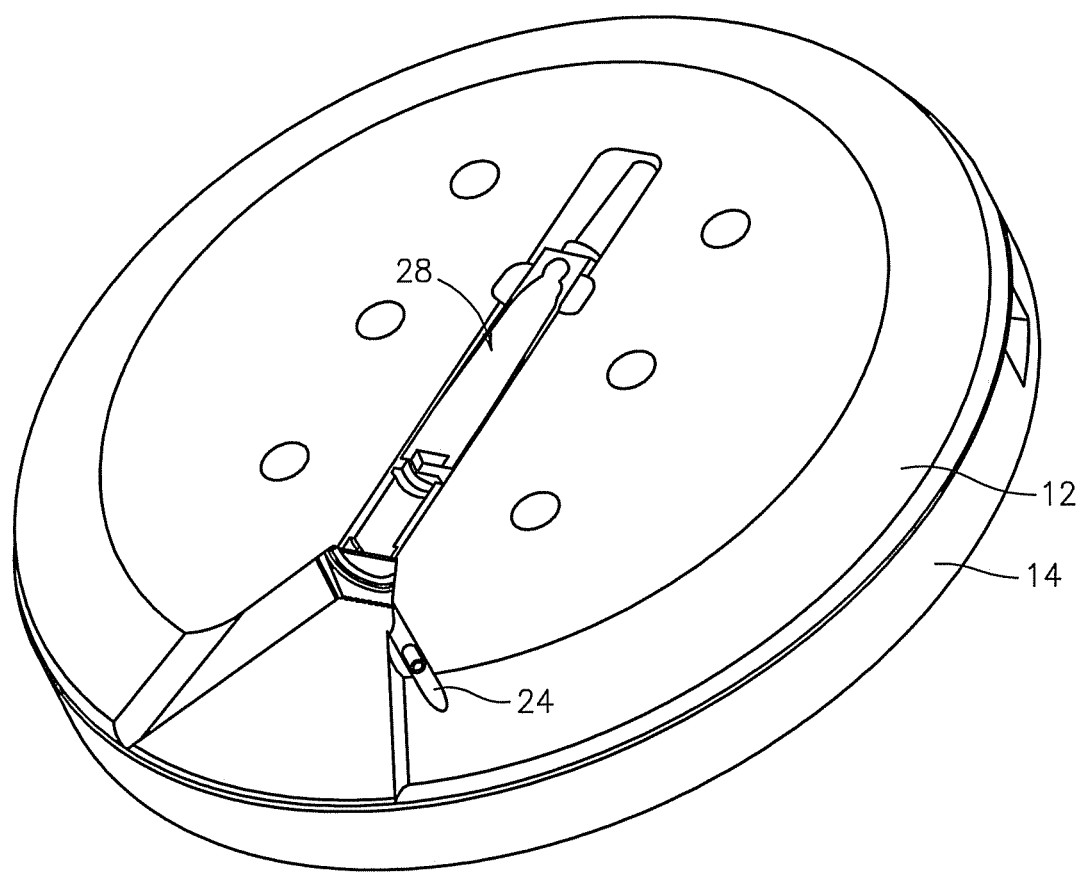
FIG. 6 is a lower perspective cross sectional view of the exemplary in-ground camera of FIG. 1.
Figure 7:
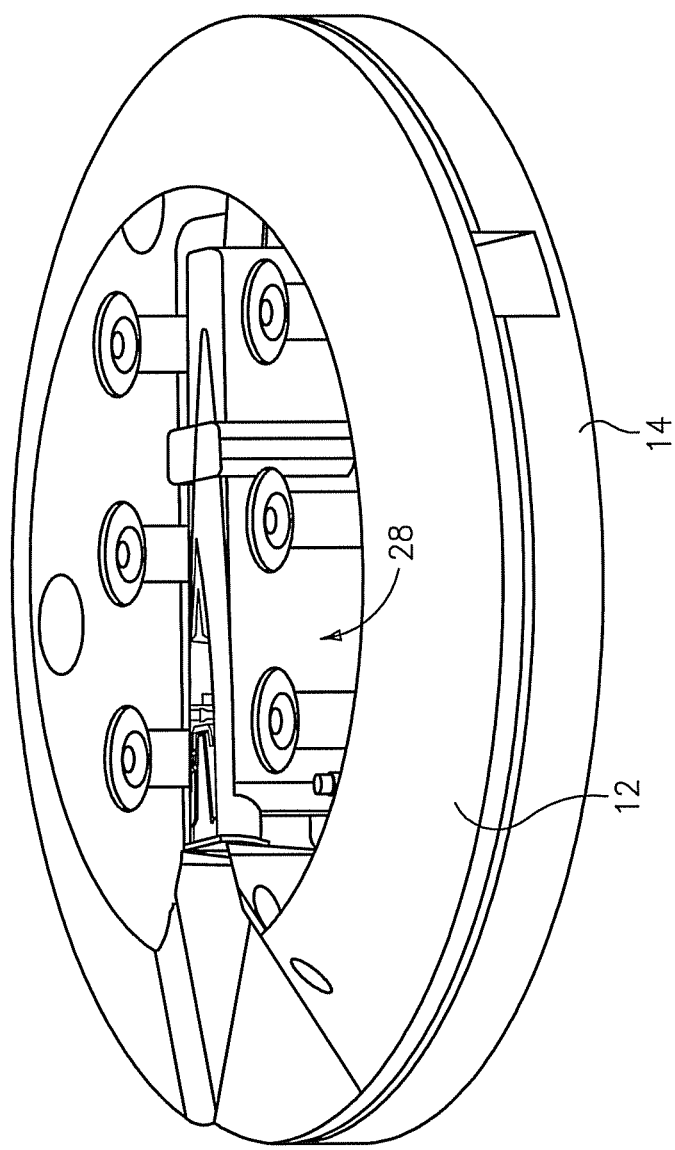
FIG. 7 is a lower side perspective cross sectional view of the exemplary in-ground camera of FIG. 1.
Figure 8:
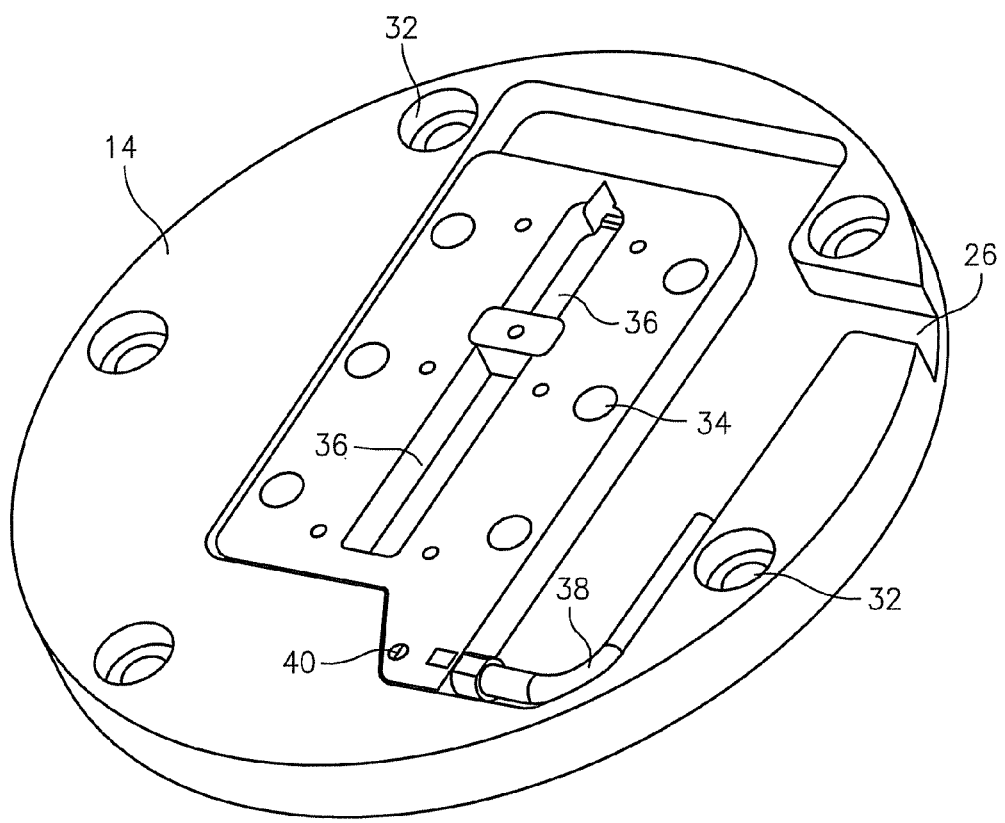
FIG. 8 is a lower perspective cross sectional view of a the exemplary in-ground camera base of FIG. 1.

A series of cross sectional perspective views will illustrate the construction of the exemplary camera of FIG. 1. FIG. 5 illustrates the six mounting screws 16 of the upper surface portion 12, the camera lens 20, and a portion of the camera primary elements 28. FIG. 6 is a lower elevation cross section that more fully shows the primary camera elements 28 and the air or fluid conduit 24. FIG. 7 also more fully shows the primary camera elements 28, which would be removed with the upper surface portion 12, upon separation from the base portion 14. FIG. 8 shows the exemplary base portion 12.

Figure 9:
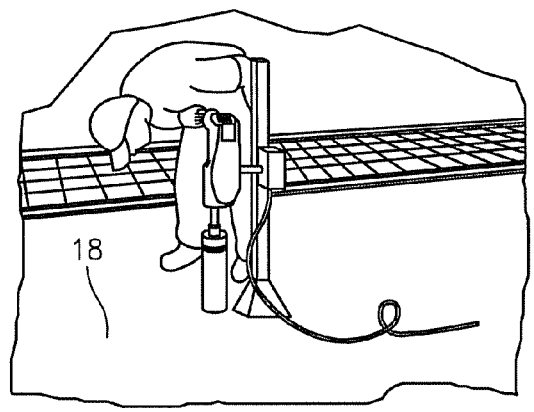
FIG. 9 is an illustration of drilling in preparation for installation of an exemplary in-ground camera.

Referring to FIG. 8, the exemplary base portion includes fastener holes 32 for securing the base within a hole in the racetrack. Brief reference is made to FIG. 9, which illustrates drilling of a hole in the racetrack surface 18, into which the base portion 14 would be secured. Fastener holes 34 correspond with and receive fasteners 16 (FIG. 1) for securing the upper surface portion 12 to the base portion 14. Indented portions 36 are also illustrated, which portions provide room for the primary camera elements 28 to nest therein when installed with the upper surface portion 12. Conduit channel 26 is also illustrated for routing media conduit. Finally fluid or air supply conduit 38 is also illustrated for feeding an upspout 40, which is connected to the air or fluid channel 24 in the upper surface portion 12.

Figure 10:
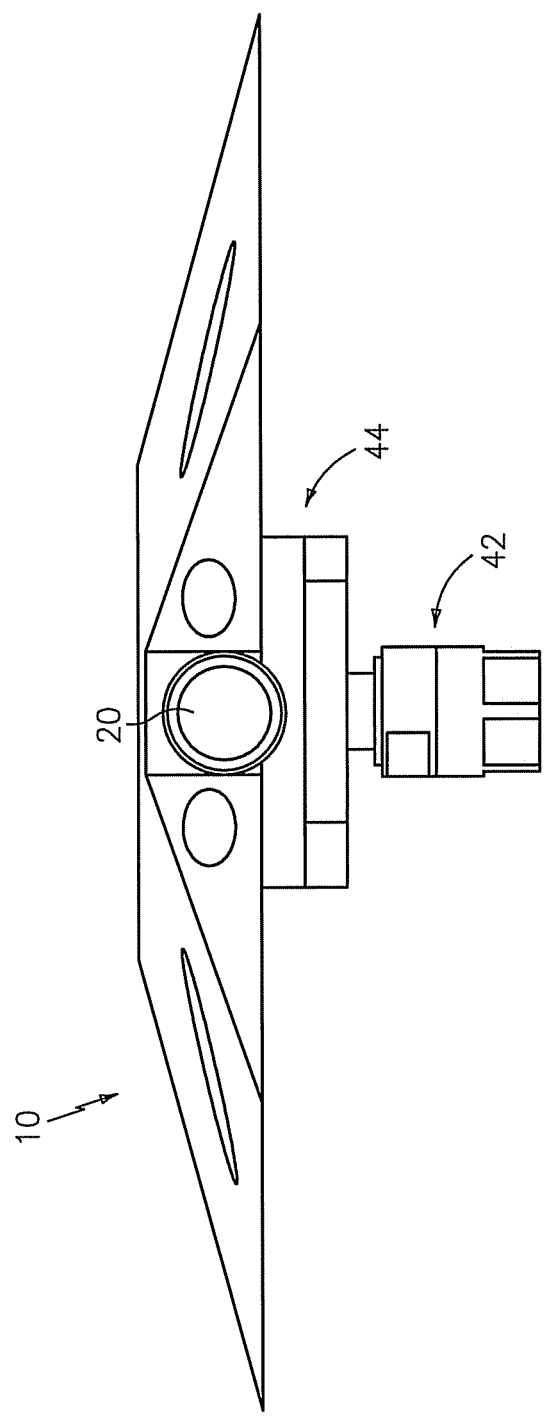
FIG. 10 is a front elevation view of another exemplary in-ground camera.
Figure 11:
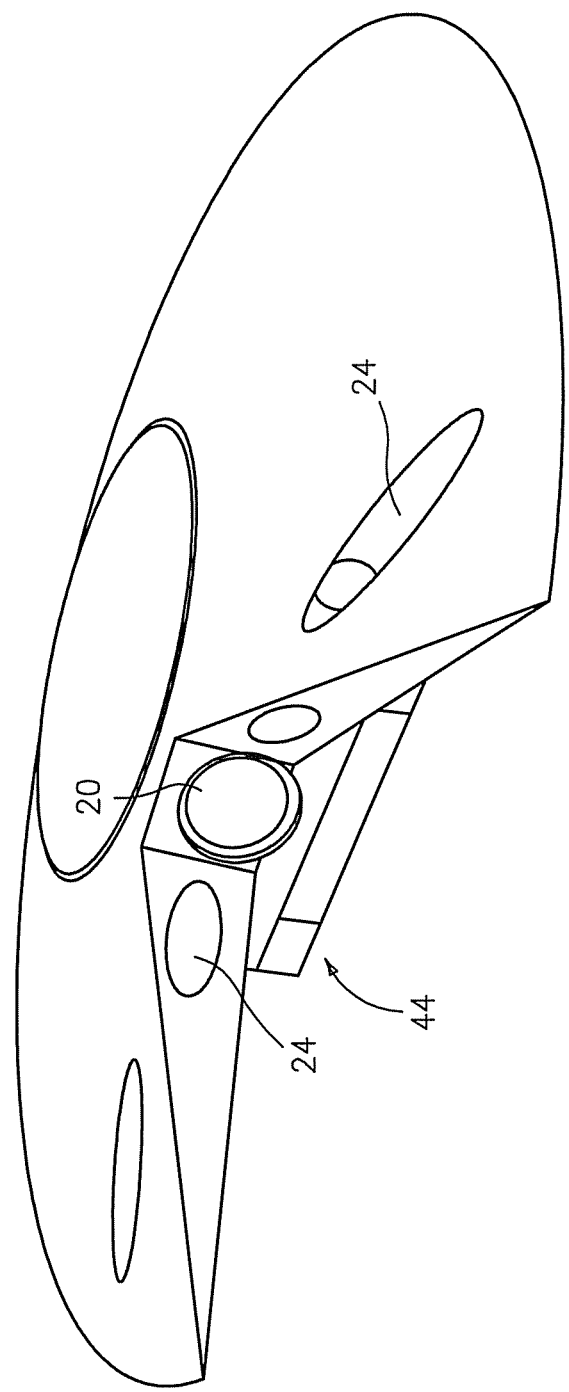
FIG. 11 is a perspective view of the exemplary in-ground camera of FIG. 10.
Figure 12:
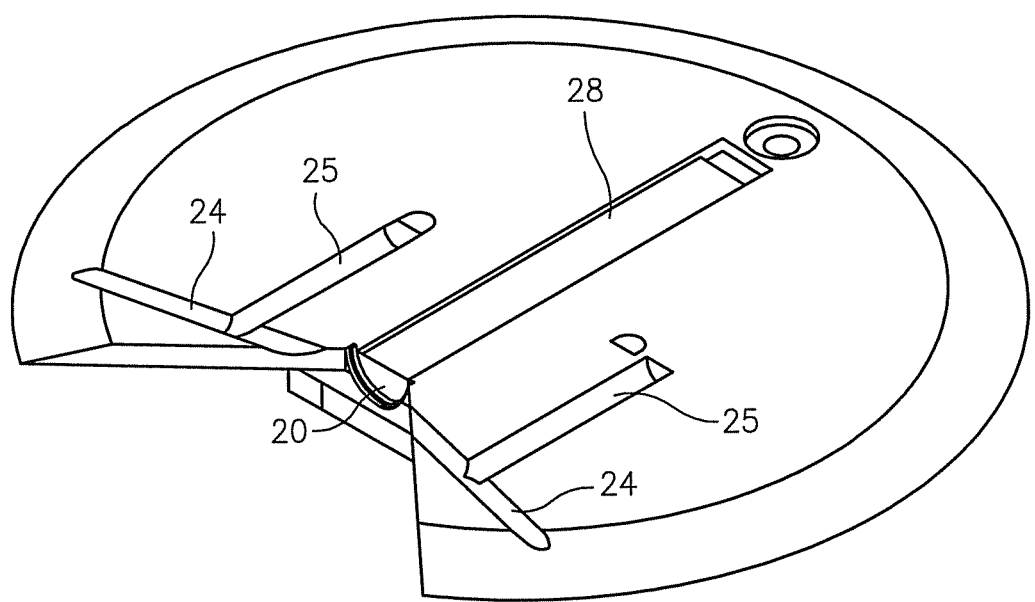
FIG. 12 is a perspective cross sectional view of the exemplary in-ground camera of FIG. 10.

Referring now to FIGS. 10 and 11, another exemplary camera is illustrated generally at 10. In this embodiment, the entire illustrated camera is detachable via securing interface and media conduit 42. Portion 44 houses the primary camera portions. Notably, this exemplary embodiment includes two air or fluid channels 24, each directed towards the lens 20. FIG. 12 illustrates the dual air or fluid channels 24 as well as connected feed channels 25 in cross section.

The above-described exemplary cameras provide an added dimension to racing by capturing images and/or sound of cars racing by, below and/or right over the camera. The camera is provided with a unique enclosure and upper surface configuration that emphasizes safety, stability and durability. Also, embodiments designed with removable camera and dummy plate portions drastically reduce operating costs associated with covering plural events, since cameras need not be purchased for each position, but instead can be removed and relocated when actual coverage is not necessary (e.g., practice or open track days). Other exemplary configuration provide for self-cleaning mechanisms that ensure use and operability of the camera throughout the event.

It will be apparent to those skilled in the art and science of cameras that, while exemplary embodiments have been shown and described, various modifications and variations can be made to the in-ground camera apparatus and method disclosed herein without departing from the spirit or scope of the invention. Accordingly, it is to be understood that the various embodiments have been described by way of illustration and not limitation.

What is claimed is:

1. An in-ground camera, comprising:
an in-ground, secure, recessed mounting interface; and
an upper surface portion, the upper surface portion operatively associated with a camera lens, primary camera components, and a media output interface or cable, wherein the upper surface portion is devoid of pointed edges and provides a downwardly concave profile having a lens and lens viewing cutout, wherein the lens and lens viewing cutout is configured to provide a lens view along a surface of or view upward from the surface of the ground, wherein the in-ground camera upper surface incorporates an air or fluid spray system provided through at least one aperture in the lens viewing cutout for cleaning the lens of the camera during use; and
wherein the upper surface portion presents no moving parts such that the upper surface is resistant to the forces of high-speed vehicles passing thereover.

2. An in-ground camera in accordance with claim 1, wherein said upper surface portion and said primary camera components are detachable from said in-ground, secure recessed mounting interface.

3. An in-ground camera in accordance with claim 1, wherein said in-ground, secure, recessed mounting interface comprises a base portion that is secured within a hole in the ground and that is configured to receive the upper surface portion and primary camera components.

4. An in-ground camera in accordance with claim 3, wherein said base portion includes at least one recess for receiving at least a portion of the primary camera components.

5. An in-ground camera in accordance with claim 1, wherein said ground comprises a racetrack surface.

6. An in-ground camera in accordance with claim 1, wherein said surface portion comprises a hardened material that is resistant to the forces of high-speed vehicles passing thereover.

7. An in-ground camera in accordance with claim 1, wherein the upper surface portion of the camera housing comprises an at least partially dome like surface that is devoid of exposed pointed edges.

8. An in-ground camera in accordance with claim 1, wherein the camera rises a maximum distance of about 0.25 inches above the surface of the ground.

9. An in-ground camera in accordance with claim 1, wherein the upper surface has a diameter of about 4 inches to provide a gentle transition between the ground surface and the top surface of the camera housing.

10. An in-ground camera in accordance with claim 1, wherein the in-ground camera upper surface incorporates a microphone to provide audio with camera video.

11. An in-ground camera in accordance with claim 1, wherein the air or fluid spray system comprises plural air or fluid spray apertures provided within the cutout.

12. An in-ground camera in accordance with claim 1, wherein the cutout is configured to direct airflow of such high-speed vehicles passing thereover towards the lens to clear or dry the lens.

\* \* \* \* \*